United States Patent
Shinbashi

[11] Patent Number: 5,325,366
[45] Date of Patent: Jun. 28, 1994

[54] ALARM SYSTEM FOR STATION IN A COMMUNICATIONS SYSTEM USING ASYNCHRONOUS THIRD-DIGITAL-STAGE SIGNAL

[75] Inventor: Masahiro Shinbashi, Kawasaki, Japan

[73] Assignee: Fujitsu Limited, Kanagawa, Japan

[21] Appl. No.: 777,940

[22] Filed: Oct. 17, 1991

[30] Foreign Application Priority Data

Oct. 18, 1990 [JP] Japan .................. 2-277734

[51] Int. Cl.⁵ .......................... G06F 11/00
[52] U.S. Cl. .................. 371/20.1; 371/48; 375/20
[58] Field of Search ........... 371/20.1, 47.1, 20.4, 371/48, 49.1; 370/110.1; 375/20, 94, 17, 19

[56] References Cited

U.S. PATENT DOCUMENTS

| | | | |
|---|---|---|---|
| 3,988,676 | 10/1976 | Whang ................... | 375/20 |
| 4,271,526 | 6/1981 | Flora ..................... | 375/17 |
| 4,282,601 | 8/1981 | Flora ..................... | 375/20 |
| 4,503,546 | 3/1985 | Yoshine et al. ......... | 375/94 |
| 4,910,750 | 3/1990 | Fisher ................... | 375/20 X |

FOREIGN PATENT DOCUMENTS 1-295537 11/1989 Japan .

Primary Examiner—Jack B. Harvey
Assistant Examiner—Edward Pipala
Attorney, Agent, or Firm—Nikaido, Marmelstein, Murray & Oram

[57] ABSTRACT

A line monitoring system for a station in a communication system in which communication with an asynchronous third-digital-stage signal is made through a communication network with which the main station and an interface device, on the sides of subscribers, are connected. Each interface device is provided with an abnormality detection device for detecting abnormality in the network and abnormality in the asynchronous third-digital-stage signal and an insertion device for inserting the output of the abnormality detection device into a special bit of the asynchronous third-digital-stage signal. On the other hand, the main station is provided with alarm receiving device performing frame synchronization of the asynchronous third-digital-stage signal output from the insertion device for deciding the state of the special bit. By virtue of the present line monitoring system monitoring an alarm for a station, when a fault occurs in the line on the side of subscriber or in the transmitted signal, the fault can be detected by the main station immediately.

4 Claims, 4 Drawing Sheets

ALARM SYSTEM FOR STATION IN A COMMUNICATIONS SYSTEM USING ASYNCHRONOUS THIRD-DIGITAL-STAGE SIGNAL

BACKGROUND OF THE INVENTION

1. Field of the Invention

The present invention relates to a line monitoring system for a station in a communication system using an asynchronous third-digital-stage signal (digital master group signal).

2. Description of the Prior Art

With the progress of an information society, communication networks are playing the role of the nerve center of a wide variety of social and economical activities. Communication networks are lately operated over a wide bandwidth and great importance is placed especially on their reliability. These days, in the U.S.A., leased lines for wideband communications with digital hierarchy third stage signals (DS3 signals) are being increasingly provided to subscribers. In such networks, because they are operated over a wideband, it can be pointed out that maintenance and operation of them are not easy tasks.

In a wideband network, special importance is placed on the quality of the line and, hence, it is required that the station of the operating company providing the DS3 signal is capable of monitoring the condition of the quality of the lines on the sides of subscribers. In networks with DS3 signals, such systems as a data link system and a C bit parity system with synchronous DS3 signals, for example, are being proposed and implemented. By use of such systems, the station of the operating company is able to monitor the condition of the quality of the line on the subscriber side.

However, in the existing communications systems with asynchronous DS3 signals, it is the present situation that the side of the station informed of occurrence of a line fault only by a claim from the subscriber. Since the station of the operating company is unable to observe, from its side, the condition of the line quality on the subscriber side, there has been a problem that the station cannot immediately detect a line fault when it occurs.

SUMMARY OF THE INVENTION

Accordingly, an object of the present invention is to provide a line monitoring system used in the existing communications system employing asynchronous third-digital-stage signals to allow the station on the side of the operating company to immediately detect the occurrence of a fault on the line on the subscriber side.

In accordance with an aspect of the present invention, there is provided a line monitoring system an for a station in a communications system in which communication with an asynchronous third-digital-stage signal is made through a communication networks with which the main station and an interface device on the side of a subscriber are connected comprising: abnormality detection device provided on the interface device for detecting abnormality in the network and abnormality in the asynchronous third-digital-stage signal; a device provided on the interface device for generating a first asynchronous third-digital-state signal; insertion device provided on the interface device for inserting the output of the abnormality detection device into a special bit of the first asynchronous third-digital-stage signal; and alarm receiving device provided in the main station for performing frame synchronization of a second asynchronous third-digital-stage signal output from the insertion device and for deciding a state of the special bit.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 2:
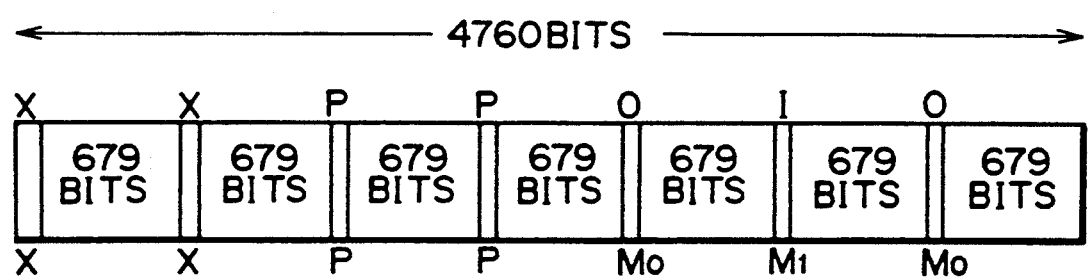
FIG. 2 is a diagram showing a frame format of an asynchronous third-digital-stage signal.

The present invention is a system utilizing the X bits of the asynchronous DS3 signal shown in FIG. 2 which are not defined now, to thereby allow the operating company on its side to monitor the line on the side of the subscriber. The X bits of the asynchronous DS3 signal are not yet defined for their use and stipulated to be set to "1" when they are not used specifically. Further, it is stipulated that, while there are two X bits in one frame, the two bits must be of the same polarity and the bits should not be changed more than once in a second.

The line monitoring utilizing the X bit of the present invention is carried out in the following manner. When something abnormal occurs in the asynchronous DS3 signal transmitted from the side of the operating company to the side of a subscriber, the X bit of the asynchronous DS3 signal output from the subscriber side to the operating company side is changed from "1" to "0", and then, the operating company side detects the change and raises an alarm to thereby inform a person, in charge of maintenance on the operating company side, of occurrence of a fault.

Figure 1:
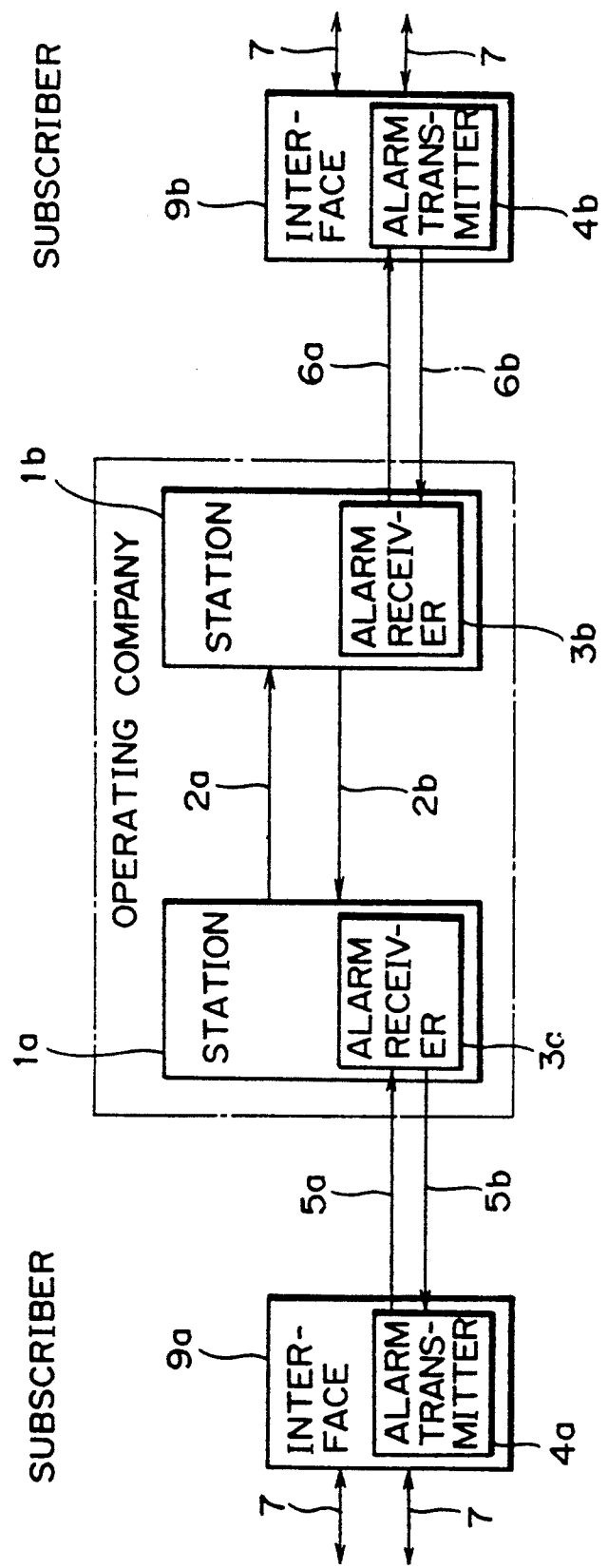
FIG. 1 is a schematic structural diagram of a communications system including a line monitoring for a station in a communication system using an asynchronous third-digital-stage signal according to an embodiment of the present invention.

The line monitoring system for the station according to an embodiment of the present invention will now be described below with reference to the accompanying drawings. Referring first to FIG. 1, the portion enclosed by the dot and dash line indicates the operating company side and reference numerals 1a and 1b denote stations on the operating company side. The stations 1a and 1b are interconnected by optical fibers 2a and 2b for two-way signal transmission. The stations 1a and 1b are provided with alarm-for-station receivers 3a and 3b of the same structure, respectively, and the alarm-for-station receivers 3a and 3b are connected with alarm-for-station transmitters 4a and 4b of the same structure provided on interface devices 9a and 9b on the subscriber sides by two way lines 5a and 5b, and 6a and 6b, respectively. The alarm-for-station transmitters 4a and 4b are each connected with communication equipment of the subscribers, not shown, by lines 7.

Figure 3:
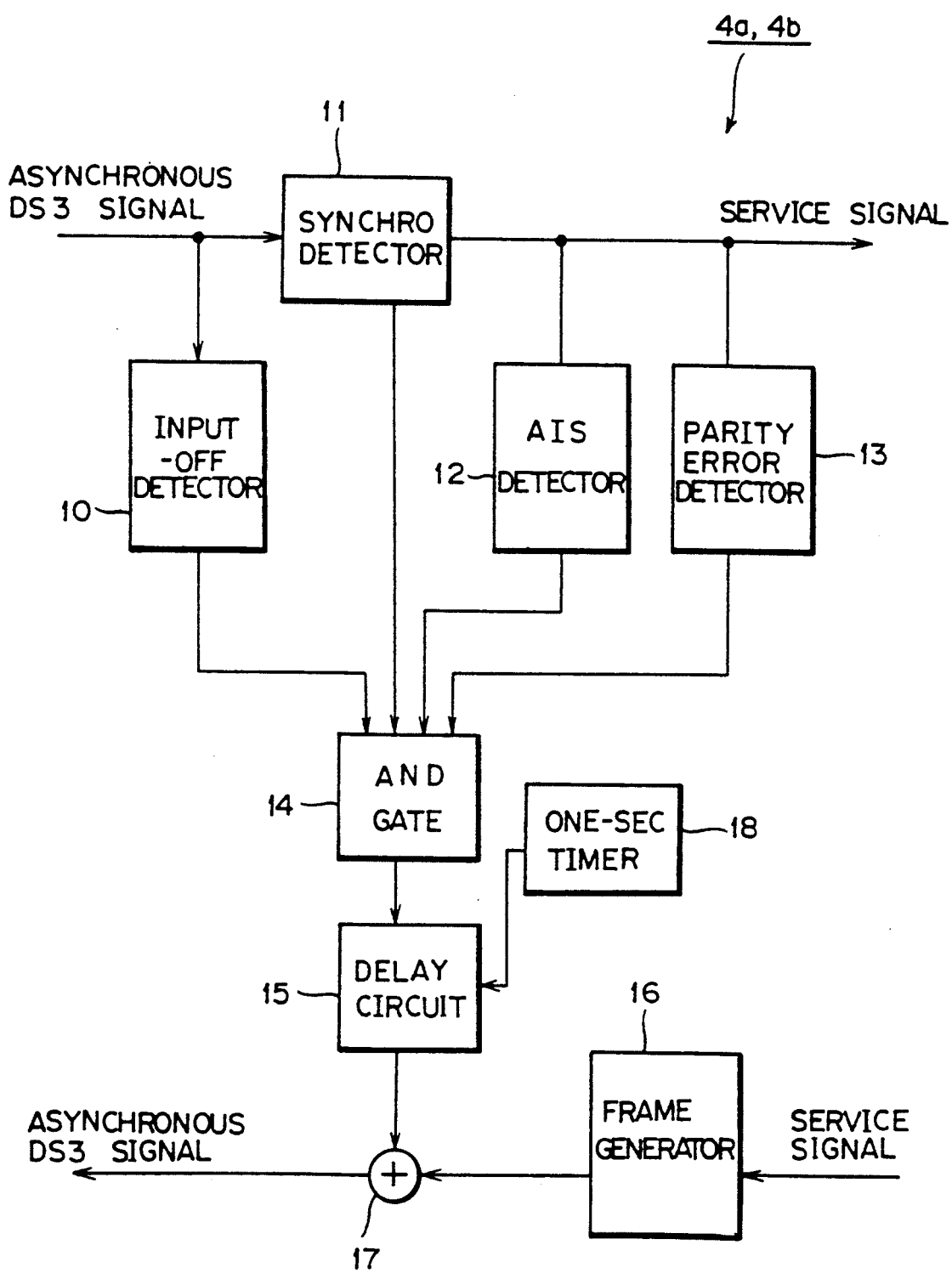
FIG. 3 is a block diagram of an alarm-for-station transmitter shown in FIG. 1.

Each of the alarm-for-station transmitters 4a and 4b comprises, as shown in FIG. 3, an input-off detector 10, a synchronization detector 11, an AIS (Alarm Indication Signal) detector 12, a parity error detector 13, an AND gate 14, a delay circuit 15, a frame generator 16, and an adder 17.

The input-off detector 10 is a portion for detecting an off state of an asynchronous DS3 signal to be input to the alarm-for-station transmitter 4a, 4b to thereby detect a breakage of the line 5b, 6a. The input-off detector 10 normally outputs a signal "1" but, when the asynchronous DS3 signal stops coming in, detects it and outputs a signal "0".

The synchronization detector performs frame synchronization of the asynchronous DS3 signal input thereto. The synchronization detector 11 outputs a signal "0" to the AND gate 14 when the signal is out of synchronism, whereas it outputs a service signal to the communication equipment of the subscriber when the signal is in synchronism. The AIS detector 12 outputs a signal "0" upon detection of an AIS. More specifically, supposing now that the line 5a or 2a, for example, is broken, the station 1a or 1b detects it and delivers an AIS, and, thus, the AIS detector 12 of the alarm-for-station transmitter 4b detects the AIS and outputs the signal "0". On the other hand, when the line 6b or 2b is broken, the AIS delivered upon the breakage is detected by the AIS detector 12 of the alarm-for-station transmitter 4a.

The parity error detector 13 detects an error of the parity bit of the asynchronous DS3 signal input thereto and outputs a signal "0" when it detects an error. The AND gate 14 obtains a logical product of the signals supplied thereto from detectors 10 to 13 and outputs the product to the delay circuit 15. The delay circuit 15 converts the signal "0" or "1" output from the AND gate 14 to a signal "0" or "1" having one second duration by means of a signal output from a one-second timer 18 and outputs the thus converted signal to the adder 17. That is, the delay circuit 15 can convert the signal output from the AND gate 14, when its duration is less than one second and it is an intermittent signal, into a signal with duration of a predetermined length of time and output it to the adder 17.

The frame generator 16 generates an asynchronous DS3 signal of the format shown in FIG. 2, and incorporates the service signal supplied from the communications equipment of the subscriber into the information slots of the asynchronous DS3 signal to be output to the adder 17. The adder 17 incorporates the signal "0" or "1" supplied from the delay circuit 15 into the X bits of the asynchronous DS3 signal supplied thereto and delivers it. The delivered asynchronous DS3 signal is sent to the alarm-for-station receiver 3b or 3a through the line 6b or 5a.

Figure 4:
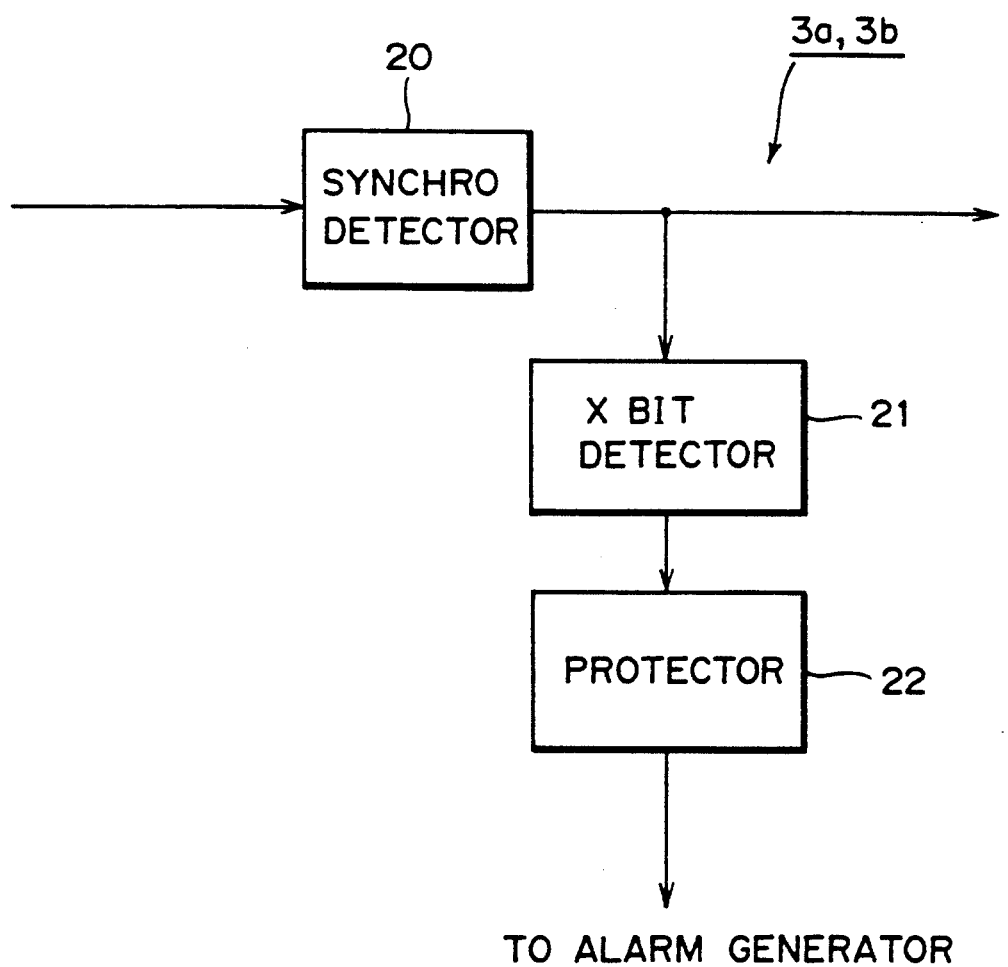
FIG. 4 is a block diagram of an alarm-for-station receiver shown in FIG. 1.

The alarm-for-station receiver 3a, 3b comprises, as shown in FIG. 4, a synchronization detector 20, an X bit detector 21, and a protection detector 20, an X bit detector 21, and a protection circuit portion 22. The synchronization detector 20 performs frame synchronization of the asynchronous DS3 signal input thereto from the alarm-for-station transmitter 4a or 4b and delivers the thus synchronized asynchronous DS3 signal to the X bit detector 21 and the opposing station 1a or 1b. The X bit detector 21 detects the X bits of the asynchronous DS3 signal and outputs the same to the protection circuit portion 22.

The protection circuit portion 22 decides the state of the X bits and outputs the result of the decision to an alarm generator, not shown. That is, when the X bits are "0", for example, it decides something abnormal exists in the asynchronous DS3 signal and outputs the result to the alarm generator. The alarm generator raises an alarm to inform the person in charge of maintenance in the operating company of the abnormality in the network or abnormality in the signal.

According to the present invention, when a fault occurs in the line on the subscriber side or in the transmitted signal in a communications system using an asynchronous third-digital-stage signal, the main station can immediately detect the fault.

What is claimed is:

1. A line monitoring system for a station in a communication system in which communication with an asynchronous third-digital-stage signal is made through a communication network with which an interface means on a subscriber side is connected to a main station, said line monitoring system comprising:

abnormality detection means, provided on said interface means, for detecting an abnormality in said communication network and an abnormality in said asynchronous third-digital-stage signal;

means, provided on said interface means, for generating a first asynchronous third-digital-stage signal;

insertion means, provided on said interface means, for inserting an output of said abnormality detection means into a special bit of said first asynchronous third-digital-stage signal; and alarm receiving means, provided in said main station, for performing frame synchronization of a second asynchronous third-digital-stage signal output from said insertion means and for deciding if an abnormality in said communication network or an abnormal signal is present based upon a state of said special bit.

2. A line monitoring system for a station according to claim 1, wherein said abnormality detection means includes input-off detection means for detecting an off state of the input thereto of a third asynchronous third-digital-stage signal from said main station, synchronization detection means for detecting an out-of-synchronization state in said third asynchronous third-digital-stage signal, alarm signal detection means for detecting an alarm signal indicating abnormality in said communication network other than that between its own interface means and said main station, and parity error detection means for detecting a parity bit error in said third asynchronous third-digital-stage signal.

3. A line monitoring system for a station according to claim 1, further including delay means for converting a detected signal output from said abnormality detection means into a detected signal having a duration of predetermined length of time.

4. A line monitoring system for a station according to claim 1, wherein said alarm receiving means includes synchronization detection means for performing frame synchronization of a second asynchronous third-digital-stage signal output from said insertion means, special bit detection means for detecting and outputting a special bit of the second asynchronous third-digital-stage signal from said synchronization detection means, and protection means for deciding the state of the special bit detected by said special bit detection means.

* * * * *